United States Patent
Akopyan et al.

(10) Patent No.: US 10,410,109 B2
(45) Date of Patent: Sep. 10, 2019

(54) PERIPHERAL DEVICE INTERCONNECTIONS FOR NEUROSYNAPTIC SYSTEMS

(71) Applicant: International Business Machines Corporation, Armonk, NY (US)

(72) Inventors: Filipp A. Akopyan, New Windsor, NY (US); Rodrigo Alvarez-Icaza Rivera, Mountain View, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 14/468,256

(22) Filed: Aug. 25, 2014

(65) Prior Publication Data
US 2016/0055408 A1 Feb. 25, 2016

(51) Int. Cl.
*G06N 3/00* (2006.01)
*G06N 3/04* (2006.01)

(52) U.S. Cl.
CPC ...................................... *G06N 3/04* (2013.01)

(58) Field of Classification Search
CPC ........................................................ G06N 3/04
USPC ........................................................ 706/26
See application file for complete search history.

(56) References Cited

U.S. PATENT DOCUMENTS

| 5,285,524 | A | 2/1994 | Cok | |
| 5,970,069 | A * | 10/1999 | Kumar | H04L 69/12 370/401 |
| 7,457,787 | B1 | 11/2008 | Furber | |
| 8,515,885 | B2 * | 8/2013 | Modha | G06N 3/063 706/16 |
| 2002/0150088 | A1 * | 10/2002 | Yoshino | H04L 12/4625 370/362 |
| 2005/0256608 | A1 * | 11/2005 | King | B65G 63/004 700/213 |
| 2011/0121857 | A1 * | 5/2011 | Nowick | H03K 19/173 326/54 |
| 2013/0073495 | A1 | 3/2013 | Izhikevich et al. | |
| 2013/0073497 | A1 | 3/2013 | Akopyan et al. | |
| 2015/0178618 | A1 * | 6/2015 | Nogaret | G06N 3/049 706/26 |

OTHER PUBLICATIONS

Berner, et al., "A 5 Meps $100 USB2.0 Address-Event Monitor-Sequencer Interface", IEEE International Syjposium on Circuits and Systmes, ISCAS 2007, May 27-30, 2007.*

(Continued)

*Primary Examiner* — Li B. Zhen
*Assistant Examiner* — Tsu-Chang Lee
(74) *Attorney, Agent, or Firm* — Sherman IP LLP; Kenneth L. Sherman; Hemavathy Perumal

(57) ABSTRACT

Embodiments of the invention provide a system and circuit interconnecting peripheral devices to neurosynaptic core circuits. The neurosynaptic system includes an interconnect that includes different types of communication channels. A device connects to the neurosynaptic system via the interconnect.

20 Claims, 8 Drawing Sheets

(56) References Cited

OTHER PUBLICATIONS

Altera, "Altera Introduces SoC FPGAs: Integrating ARM Processor System and FPGA into 28-nm Single-Chip Solution", Altera Press Release, Oct. 11, 2011.*

John et al., "A Dynamically Reconfigurable Interconnect for Array Processors", IEEE Transactions on Very Large Scale Integrated (VLSI) Systems, vol. 6, No. 1, Mar. 1998.*

Serrano-Gotarredona, R. et al., "AER Building Blocks for Multi-Layer Multi-Chip Neuromorphic Vision Systems", Proceedings of the 2005 Advances in Neural Information Processing Systems (NIPS), 2005, pp. 1-8, University of Zurich, Switzerziand.

Merolla, P.A., et al., "Expandable Networks for Neuromorphic Chips", Proceedings of the 2007 IEEE Transactions on Circuits and Systems I: Regular Papers, Feb. 2007, pp. 301-311, No. 2, IEEE, United States.

Rast, A.D. et al., "Virtual Synaptic Interconnect Using an Asynchronous Network-on-Chip", Proceedings of the 2008 IEEE International Joint Conference on Neural Networks (IEEE World Congress on Computational Intelligence), (IJCNN 2008), Jun. 1-8, 2008, pp. 2727-2734, IEEE, United States.

Munipalli, S.K., "An FPGA Implementation of a High Performance AER Packet Network", Jan. 1, 2013, Dissertations and Theses (Open Access), Jan. 1, 2013, pp. 1-105, Portland State University, United States.

Iyer, S.S. et al., "Embedded DRAM: Technology platform for the Blue Gene/L chip" IBM Journal of Research and Development, Mar./May 2005, pp. 333-350, vol. 29, Issue No. 2/3, IBM, United States.

Furber, S.B., "A Fascicle Impulse-Rate Encoded (FIRE) Neural Architecture", Department of Computer Science, Oct. 2000, pp. 1-7, University of Manchester, United Kingdom.

Merolla, P. et al., "The USB revolution", The Neuromorphic Engineer, 2005, pp. 1-2, Institute of Neuromorphic Engineering, United States.

List of IBM Patents or Patent Applications Treated as Related.

List of IBM Patents or Patent Applications Treated as Related: Akopyan, F., et al., U.S. Appl. No. 16/427,170, filed May 30, 2019.

* cited by examiner

PERIPHERAL DEVICE INTERCONNECTIONS FOR NEUROSYNAPTIC SYSTEMS

This invention was made with Government support under HR0011-09-C-0002 awarded by Defense Advanced Research Projects Agency (DARPA). The Government has certain rights in this invention.

BACKGROUND

The present invention relates to data mapping for neuromorphic and synaptronic computational systems, and in particular, interconnecting peripheral devices for neuromorphic and synaptronic computational systems.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

Neuromorphic devices communicate to personal computers (PCs) and peripheral devices via standard interfaces (e.g., universal serial bus (USB), peripheral component interconnect (PCI) using custom protocol converters, etc.). These converters translate the native protocol of neuromorphic chips (spikes) into the desired standard protocols (e.g., USB 2.0) and vice versa. Standard interfaces typically requires a host computer, such as a laptop computer in the loop. Therefore, the minimal neuromorphic system requires a laptop computer, a sensor and a neuromorphic board, which makes it difficult to create real-time systems; and power consumption (>5 W) prohibits embedded systems.

BRIEF SUMMARY

One or more embodiments provide devices for interconnecting peripheral devices to neurosynaptic core circuits. One embodiment comprises a system that includes an interconnect that includes different communication channels. A device connects to the neurosynaptic system via the interconnect.

These and other features, aspects, and advantages of the present invention will become understood with reference to the following description, appended claims, and accompanying figures.

DETAILED DESCRIPTION

The present invention relates to interconnecting peripheral devices with for neuromorphic and synaptronic devices, and in particular, interconnects for connecting various types of peripheral devices to multiple core processing circuits of a neurosynaptic system.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

Figure 1:
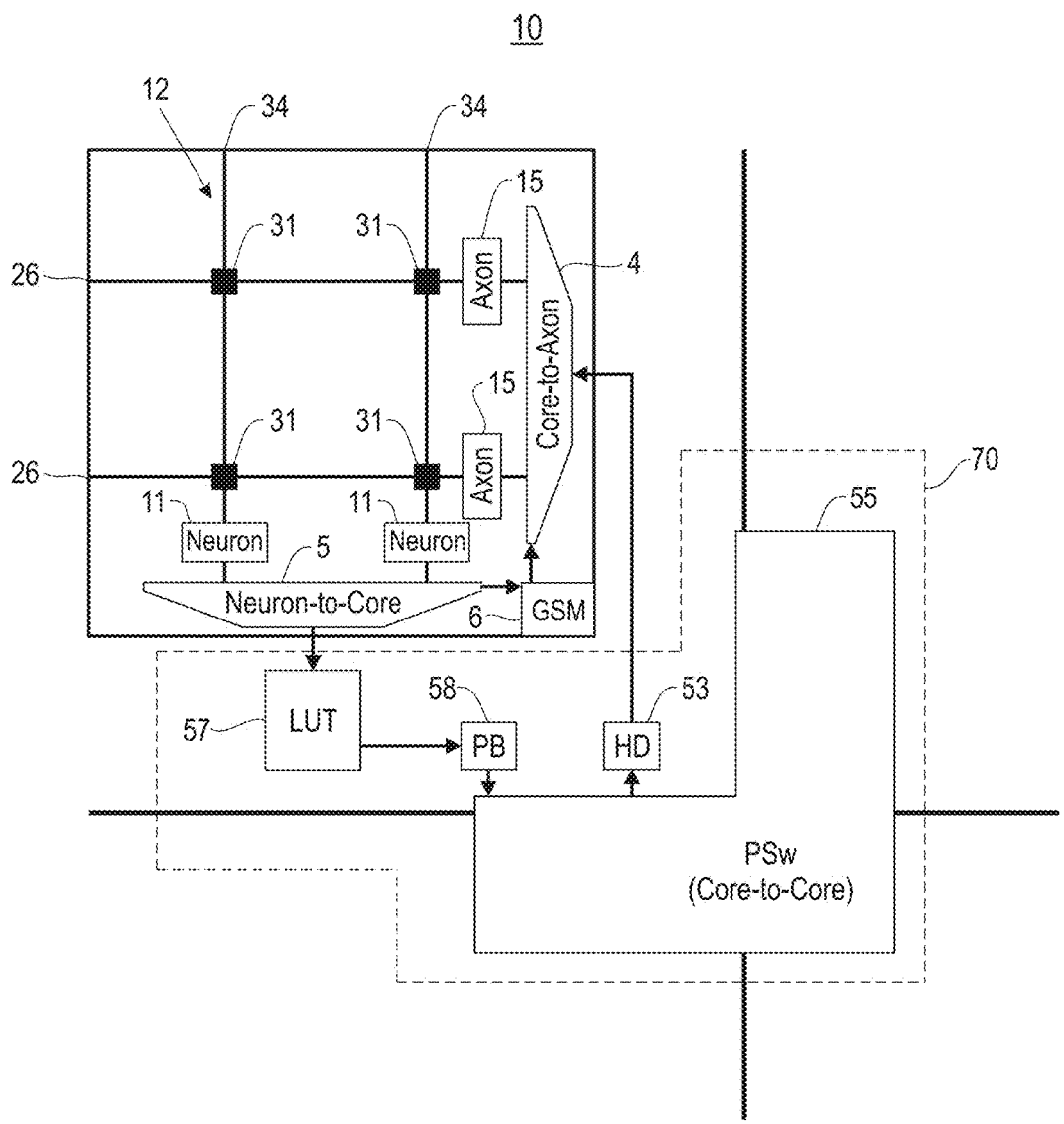
FIG. 1 illustrates an example neurosynaptic core circuit ("core circuit"), in accordance with an embodiment of the invention.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "×" represents multiplication, and m and n are positive integers.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256×256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation (AER)). Firing event (i.e., spike event) arrival times included in address events may be deterministic or non-deterministic.

Although certain illustrative embodiments of the invention are described herein using synapses comprising electronic circuits, the present invention is not limited to electronic circuits.

Figure 2:
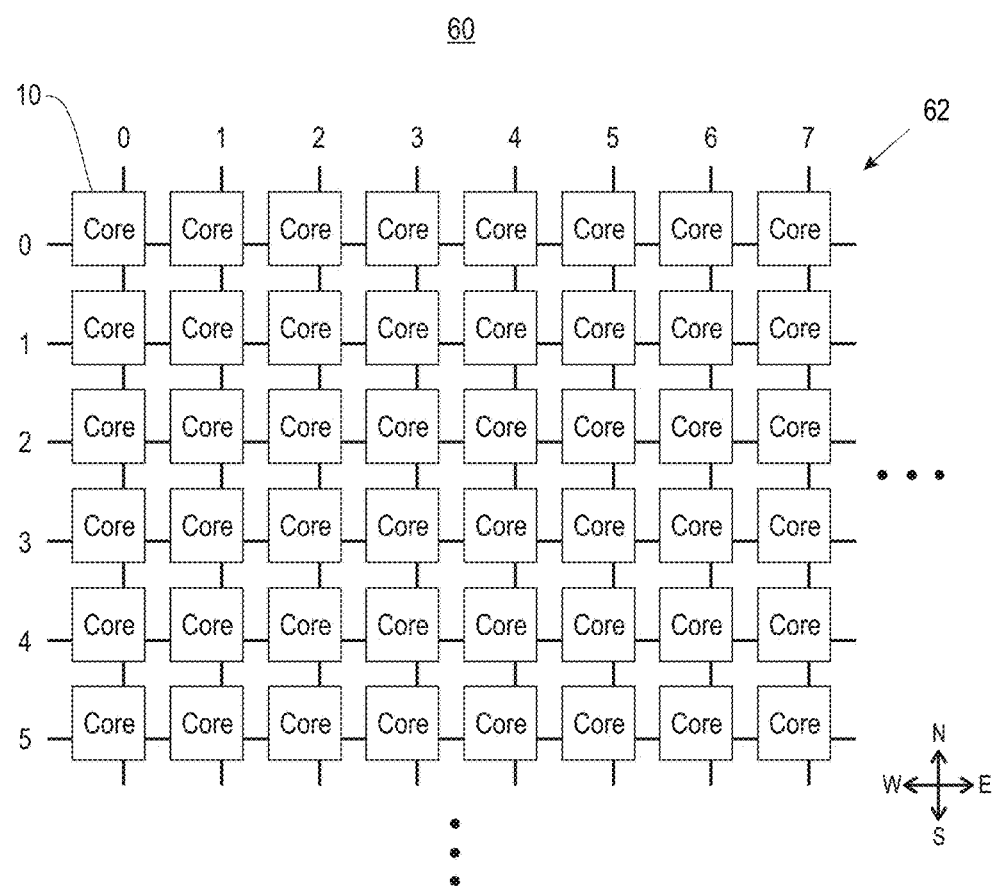
FIG. 2 illustrates an example neurosynaptic network circuit, in accordance with an embodiment of the invention.

FIG. 2 illustrates an example neurosynaptic network circuit 60, in accordance with an embodiment of the invention. The network circuit 60 is an example multi-core neurosynaptic system comprising multiple interconnected core circuits 10. In one embodiment, the core circuits 10 are arranged as a two-dimensional tile-able core array 62. Each core circuit 10 may be identified by its Cartesian coordinates as core (i, j), where i is a row index and j is a column index of the core array 62 (i.e., core (0,0), core (0,1), . . . , core (5,7)). In one embodiment, the neurosynaptic network circuit 60 may be referred to as an example TrueNorth system.

Each core circuit 10 utilizes its core-to-core PSw 55 (FIG. 1) to pass along neuronal firing events in the eastbound, westbound, northbound, or southbound direction. For example, a neuron 11 (FIG. 1) of the core circuit (0,0) may generate a firing event targeting an incoming axon 15 (FIG. 1) of the core circuit (5,7). To reach the core circuit (5,7), the firing event may traverse seven core circuits 10 in the eastbound direction (i.e., from core (0,0) to cores (0,1), (0,2), (0,3), (0,4), (0,5), (0,6), and (0,7)), and five core circuits 10 in the southbound direction (i.e., from core (0,7) to cores (1, 7), (2, 7), (3, 7), (4, 7), and (5, 7)) via the core-to-core PSws 55 of the network circuit 60.

Figure 3:
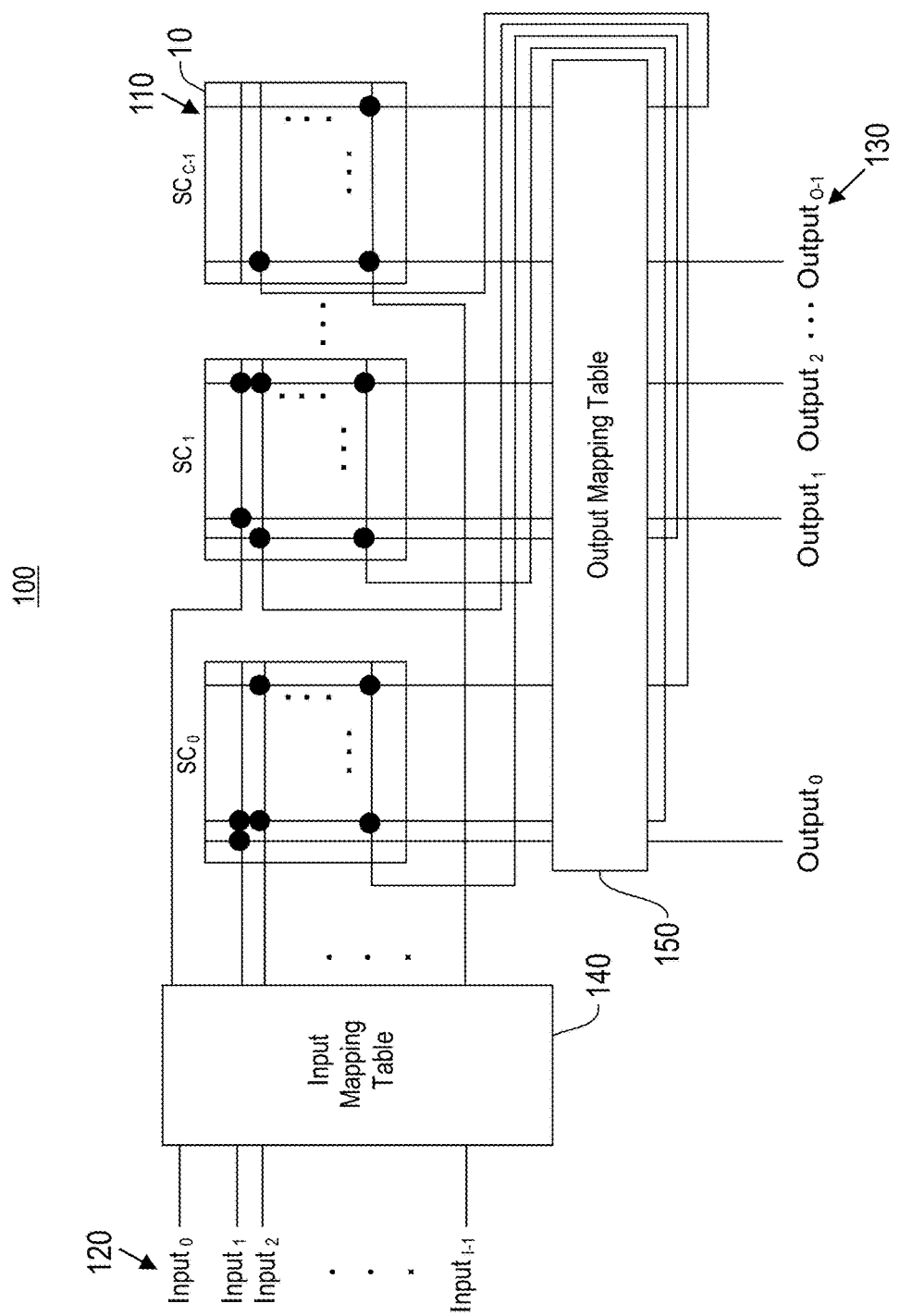
FIG. 3 illustrates an example corelet for at least one core circuit, in accordance with an embodiment of the invention.

FIG. 3 illustrates an example corelet 100 for at least one core circuit 10, in accordance with an embodiment of the invention. A corelet 100 is a structural description of one or more core circuits 10. Corelets 100 are applicable to different types of neural core circuits. In one embodiment, a corelet 100 is a static configuration file for programming a portion (i.e., a fraction) of a core circuit 10 or an entire core circuit 10. Corelets 100 may also be composed in a hierarchical fashion, such that a corelet 100 may be used to program two or more corelets 100 representing multiple interconnected core circuits 10.

A corelet 100 may program the neuronal activity of one or more core circuits 10 of the neural network circuit 60. For example, a corelet 100 may be used to program the routing fabric 70 of a core circuit 10. Other examples of activities a corelet 100 may program a core circuit 10 to perform include edge detection in image/video, motion history tracking in video, object classification, sense-response in a robotic environment, sound filtering, etc.

Each corelet 100 comprises C constituent units ("constituent sub-corelets") 110, wherein C is an integer greater than or equal to one. Each sub-corelet 110 defines one of the following: a portion (i.e., a fraction) of a core circuit 10, an entire core circuit 10, or a corelet 100 that in turn defines multiple interconnected core circuits 10. For example, as shown in FIG. 3, each sub-corelet 110 represents a core circuit 10.

All sub-corelets 110 of the corelet 100 are numbered. For example, each sub-corelet 110 may be identified by a corresponding index $SC_i$, wherein $0 \leq i \leq C-1$.

The corelet 100 receives I inputs 120, wherein I is an integer greater than or equal to one. Each input 120 may represent a firing event from another corelet 100 or an input from an external system, such as sensory input from an external sensory system. All inputs 120 received by the corelet 100 are addressed. For example, each input 120 may be addressed by a corresponding index Input, wherein $0 \leq j \leq I-1$.

The corelet 100 generates O outputs 130, wherein O is an integer greater than or equal to one. Each output 130 may represent a firing event generated by a neuron 11 of a sub-corelet 110. Each output 130 may be routed to another corelet 100 or an external system, such as an external motor system. All outputs 130 generated by the corelet 100 are addressed. For example, each output 130 may be addressed by a corresponding index $Output_k$, wherein $0 \leq k \leq O-1$.

The corelet 100 further comprises an input mapping table 140 and an output mapping table 150. In one embodiment, each table 140, 150 is a routing table that maintains routing information. As described in detail later herein, the input mapping table 140 maintains routing information for each input 120 received by the corelet 100. Based on the input mapping table 140, each received input 120 is mapped to an input of a sub-corelet 110 within the corelet 100. If each sub-corelet 110 is a core circuit 10, each received input 120 is mapped to a target incoming axon 15. If each sub-corelet 110 is a corelet 100, each received input 120 is mapped to an input 120 of a corelet 100.

The output mapping table 150 maintains routing information for each output generated by each sub-corelet 110 of the corelet 100. If a sub-corelet 110 is a core circuit 10, the output generated by the sub-corelet 110 is a firing event. If a sub-corelet 110 is a corelet 100, the output generated by the sub-corelet 110 is an output 130. Based on the output mapping table 150, each output generated by a sub-corelet 110 is mapped to one of the following: an input of a sub-corelet 110 within the corelet 100 (e.g., a target incoming axon 15, or an input 120 of a corelet 100), or an output 130 of the corelet 100. As stated above, each output 130 is routed to another corelet 100.

The example corelet 100 shown in FIG. 3 comprises three sub-corelets 110, wherein each sub-corelet 110 represents a core circuit 10. In one embodiment, each core circuit 10 comprises a 256×256 ultra-dense crossbar 12 (FIG. 1) of synapses 31 (FIG. 1) that interconnects 256 neurons 11 (FIG. 1) with 256 incoming axons 15 (FIG. 1). At maximum, the corelet 100 in FIG. 3 has about 768 (i.e., 256×3) inputs 120 and about 768 (i.e., 256×3) outputs 130. The number of inputs 120 and the number of outputs 130 may be less, depending on the interconnections between the sub-corelets 110 as determined by the input mapping table 140 and the output mapping table 150.

Figure 4:
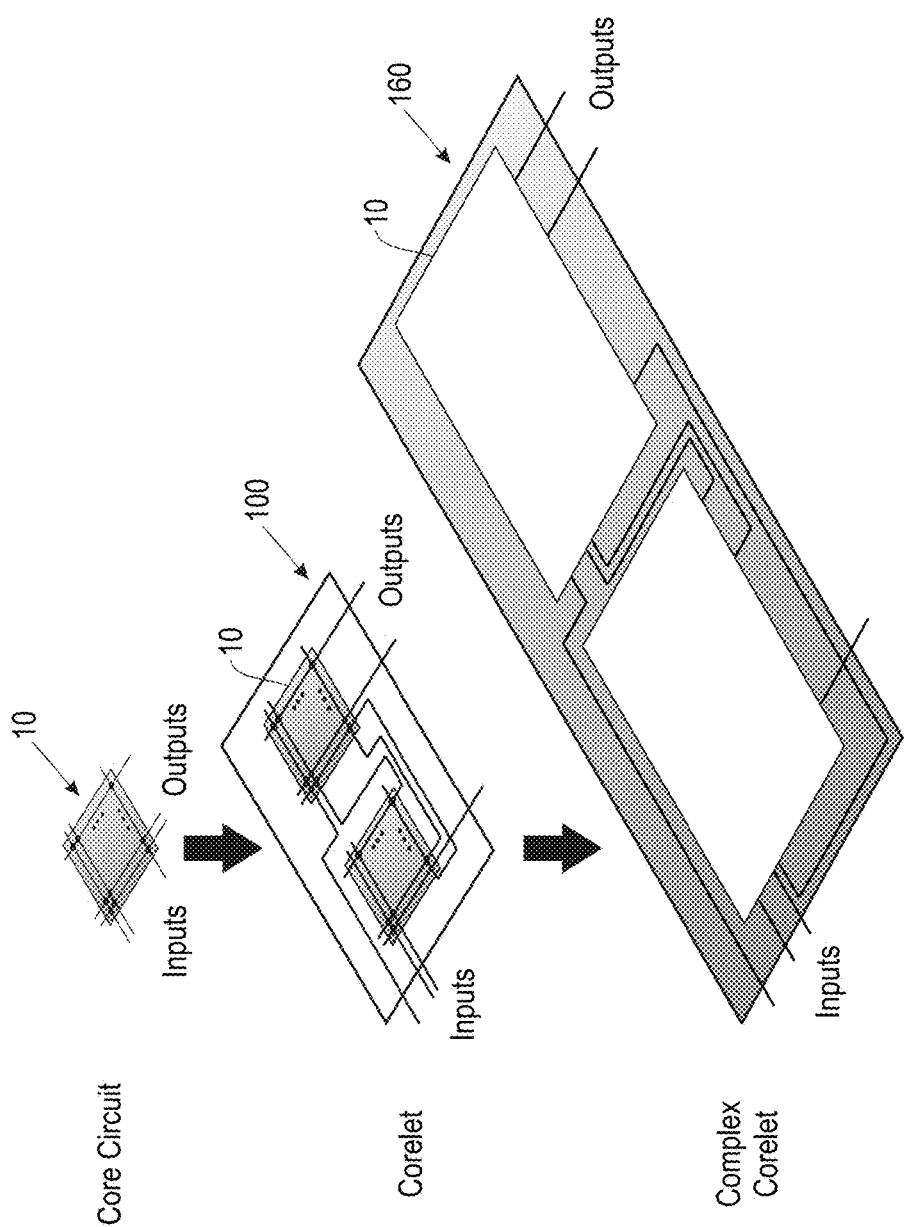
FIG. 4 illustrates a hierarchical composition of corelets, in accordance with an embodiment of the invention.

FIG. 4 illustrates a hierarchical composition of corelets 100, in accordance with an embodiment of the invention. Each corelet 100 is modular, reusable, and scalable. Corelets 100 may be combined to form a corelet 100. In one embodiment, a complex corelet 160 is a corelet 100 that is composed of at least two corelets 100. Complex corelets 160 are used to program multiple corelets 100 representing multiple interconnected core circuits 10.

In one embodiment, a neurosynaptic system configured using corelets (e.g., corelets 100, FIG. 3) and interconnecting peripheral devices that are fundamentally event-based and provide a standard for building multiple input-output devices. In one embodiment, the peripheral devices may include: cameras or retinal sensors, microphones or cochlea sensors, GPS devices, motion sensors, temperature sensors, motor controllers, and other types of sensors, etc. In one embodiment, peripheral devices may also include routers, switches and other network components for allowing building extensive local and wide area networks. In one embodiment, a peripheral device may also include another TrueNorth system, where the interconnects enable board to board connectivity.

Figure 5:
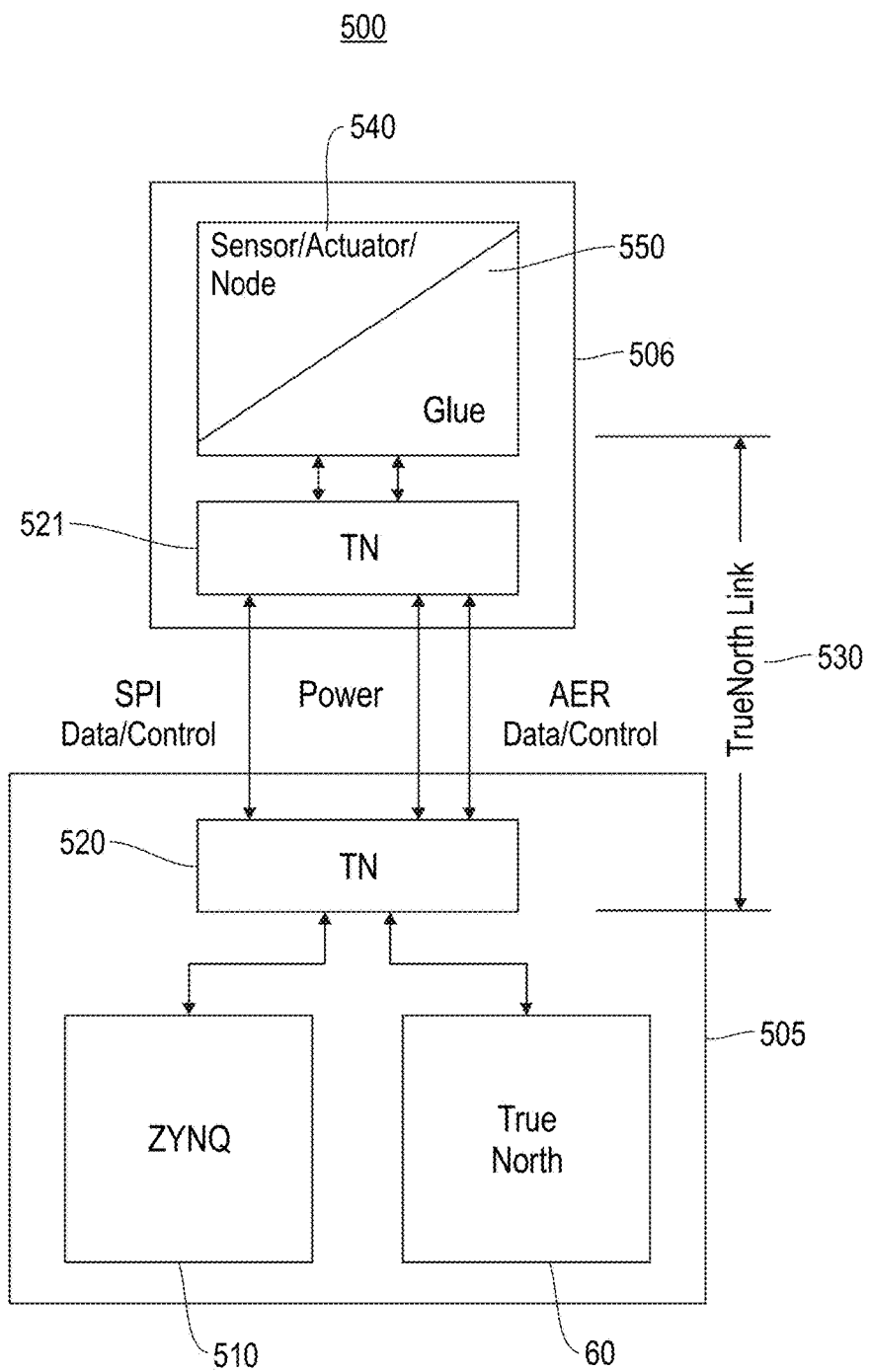
FIG. 5 illustrates an example of a TrueNorth system with a TrueNorth link.

FIG. 5 illustrates an example of a TrueNorth system 500 with a TrueNorth link 530, that may be used by one or more embodiments. In one embodiment, the system 500 includes a first computational device 505 and a second computational device 506 connected by the TrueNorth link 530, which includes the interfaces 520 and 521, respectively. In one example embodiment, the first computational device 505 includes a TrueNorth device 60 and a system on chip (SoC) device 510, such as an Xlinx ZYNQ device. In one example embodiment, the second computational device 506 includes a sensor or actuator node 540 and glue 550. In one example, the TrueNorth link 530 is AER/Event-based, and asynchronously transmits 'spikes' from the sensor to a host. In one example, for retina sensors, spikes encode visual changes as events.

In one example, the TrueNorth link 530 also is serial peripheral interface (SPI)/Clock-based, and delivers, for example, pixel brightness on a frame-by-frame basis as a regular camera, via a clocked interface. In one example, the system 500 converts frame-based data (brightness) into a spike rate that is transmitted over AER. In the TrueNorth system 500, the conversion to a spike rate requires relaying such spike rates—through TrueNorth chips—to the ZYNQ 510, where the spike rate is integrated to recover the brightness. This, however, is a very inefficient way to capture frame-based data.

In one example, the system 500 using the TrueNorth link 530 extends and standardizes the hardware link and the firmware to serve any conceivable input/output (I/O) device. In one example, the TrueNorth link 530 includes: bidirectional AER for event-based communication directly to/from TrueNorth devices (e.g., TrueNorth device 60); bi-directions SPI for clocked communication directly to the FPGA (e.g., ZYNQ 510); data and control on both channels: both AER and the SPI interface may transmit configuration, status and control signals between devices—either from the ZYNQ 510 or from a TrueNorth device 60. In one example, the TrueNorth link 530 may source or sink power.

Figure 6:
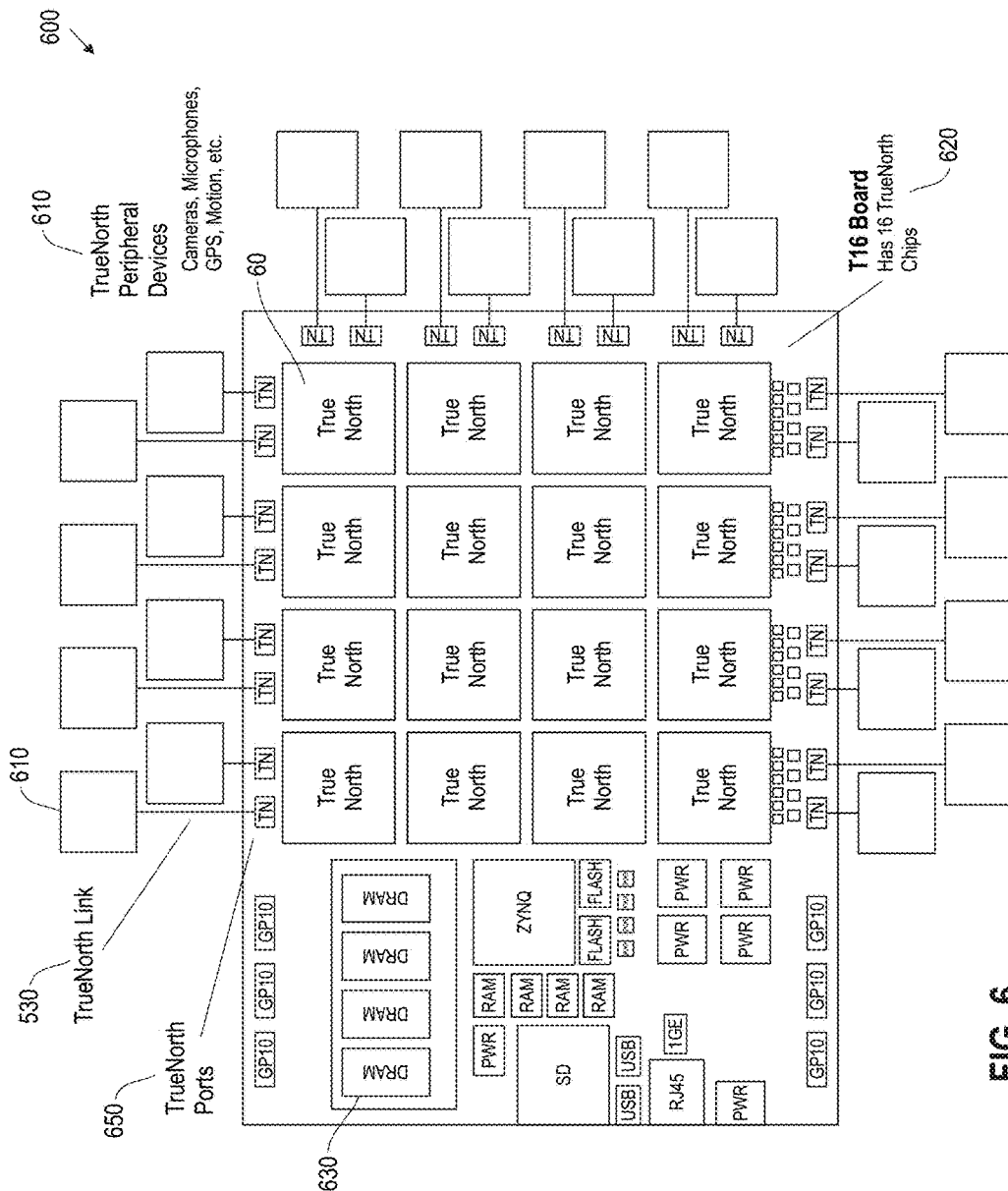
FIG. 6 illustrates an example of system board with connectivity between peripheral devices and neurosynaptic cores via TrueNorth link interconnects, in accordance with an embodiment of the invention.

FIG. 6 illustrates an example of system board 600 with connectivity between peripheral devices 610 and neurosynaptic cores 60 via TrueNorth links 530 as interconnects, in accordance with an embodiment of the invention. In one embodiment, all TrueNorth ports 650 may be identical, and each neurosynaptic network circuit 60 (TN64) has two ports 650. In one example embodiment, the circuit board 620 includes twenty four (24) independent TrueNorth ports 650 in total. In one embodiment, the circuit board 620 includes other devices, such as memory devices 630 (e.g., DRAM devices, etc.), other memory devices (e.g., RAM, cache, flash memory, etc.), GPIO ports, power devices, ZYNQ, etc.

In one embodiment, each TrueNorth port 650 may include: direct event-based communication to/from each neurosynaptic network circuit 60 (TN64); direct clock-based communication to/from a ZYNQ; and communication includes data and control to/from each neurosynaptic network circuit 60 (TN64) and ZYNQ. In one embodiment, a set of peripheral devices 610 may use event-based communication (e.g., spikes/AER) as well as a clocked-based interface.

In one embodiment, for each TrueNorth link 530, a Hardware Specification may be as follows. In one embodiment, the connector size for each TrueNorth link 530 should fit in ½ of the width of a neurosynaptic network circuit 60 (TN64): 35 mm/2=17.5 mm max width. In one embodiment, the connectors may include candidates of: FI-JP, FI-JZ and FI-JW Series from JAE. In one embodiment, the minimum bandwidth for the connectors for each TrueNorth link 530 may be as follows: for SPI 16 MHz, and for AER 50 MHz. In one embodiment, the signaling levels for the TrueNorth link 530 may be provided as: 1.8 V for AER and SPI. In one embodiment, the cable length for each TrueNorth link 530 connector may be 2 meters (at min bandwidth).

In one embodiment, the power transfer for each TrueNorth link 530 may be 4.5-5.5V @ 1 W (Max current is 0.2 Amps). In one embodiment, for each TrueNorth link 530 connector, the connector pin allocation may include 50 total pins, where 42 AER pins: 19 Data, 1 Req (from source), 1 Ack (from destination) per channel; 2 channels: Full Duplex; and 3 SPI pins: Clk, SDI (peripheral input), serial data out (SDO) (peripheral output); Master-slave. In one embodiment, the minimum clock frequency may be 16 MHz. In one embodiment, additional SDI/SDO channels may be added if higher pin-count connectors are available. In one embodiment, the additional pins may be provided as follows: 3 Control pins: 1 Reset, 1 Interrupt, 1 tl_clk; 2 Power pins: Vdd, Gnd. 4.5 to 5 V unregulated; 1 W max total transmission. In one embodiment, additional power pins may be added if higher pin-count connectors are available.

In one embodiment, the connectors for each TrueNorth link 530 may have the following requirements. In one example, for board to wire: a small footprint and small profile may be provided as follows: the maximum allowable pitch: 17.5 mm/50 pins=0.35 mm/pin; 0.25 mm pitch fits in 12.5 mm wide; and 0.70 mm pitch fits in 2 rows (17.5 mm wide each). In one example embodiment, the following may be used: from JAE (e.g., the JAE website) FI-JP Series, FI-JZ Series, and FI-JW Series. In one embodiment, the wire for each TrueNorth link 530 connector may include: round-multiconductor wire: selected shielded signals (AER req/ack); ribbon/flex: may or may not have shields between signals; maximum conductor outside diameter of 0.25 mm (AWG 44-46); noise tolerances should enable running SPI at 16 MHz and AER at 50 MHz. In one example embodiment, for peripheral devices 610, the wire for the connectors of the TrueNorth link 530 may be soldered directly into PCB, which eliminates the need for a connector.

In one embodiment, firmware on a peripheral device 610 supports two fully independent communication channels and protocols, and when necessary, arbitrates between them. In one embodiment, the channels are: AER: full duplex; and SPI: Master-slave. In one embodiment, firmware implements a standardized register map for communication and control. In one embodiment, the register map is accessible via SPI and AER. In one embodiment, through the TrueNorth link 530 interface, a host may query the peripheral's (e.g., peripheral device 610) ID and base features. In one example embodiment, firmware may also implement a custom/extended register map to serve the unique requirements of arbitrary peripheral devices 610.

In one embodiment, the SPI Packet Structure (Variable bit length) for the TrueNorth link 530 interface includes four (4) fields with the following order and bit count: register address: 9 bits. In one embodiment, the register address defines which register is being read/written from/to. In one embodiment, read/write comprises 1 bit. In one example embodiment, data is read from a register (via SPI) when the bit is zero, and written when bit is one. In one embodiment, the data length is 10 bits, and defines how many bits of data will be read/written from/to. In one embodiment, data size is between: 1-1024 bits (as set by the data length). In one example embodiment, all of the fields are in big-endian format.

In one embodiment, the AER Packet structure for the TrueNorth link 530 interface is provided as follows: two-phase odd/even serialized with req/ack; de-serialized data fields as follows:

Data[37]=Not used
Data[36:32]=Funnel IO port
Data[31:23]=DX (bit 23 has sign. 0 for eastbound.)
Data[22:14]=DY (bit 22 has sign. Data[23]^Data[22]=0 for northbound, 1 for southbound.
Data[13:12]=Debug and reserved bit
Data[11:8]=Delivery time (mod 16)
Data[7:0]=Target Axon In one embodiment, firmware interpretation of an AER packet for the TrueNorth link 530 interface is provided such that the AER packets are designed to travel through a neurosynaptic core array (e.g., each neurosynaptic network circuit 60 (TN64)), therefore to interpret AER packets, the firmware on a peripheral device 610 implements a 'virtualized' neurosynaptic core array. In one example embodiment, the Target Axon, DY and Funnel ports are used to target control and data registers on the peripheral device 610. In one embodiment, for maximum generality, the DX field is not used as this is only available on east/west ports of TrueNorth chips (e.g., neurosynaptic network circuit 60 (TN64)).

In one embodiment, AER packets operate on control registers that operate by setting (or changing) a variable's value when targeted by AER packets with predefined Funnel IO, DY and Axon Targets. In one example embodiment, for an imager peripheral device 610, the exposure level of the imager is set by targeting an AER packet to a predefined register (e.g., thermometer code), or this exposure level may be increased or decreased by targeting predefined registers (delta code). In other example embodiments, other encoding may include time to spike, rate code, etc.

In one embodiment, the peripheral devices 610 may act as packet repeaters or routers, to other peripheral devices 60 or other TrueNorth systems, for both SPI and AER communication channels. In one embodiment, chaining peripheral devices 610 and routing within peripheral devices 610 is provided via SPI pass-through. In one example embodiment, an SPI command sent via SPI to a peripheral device 610 directly connected to a TrueNorth system (e.g., another system 600) may instruct such peripheral device 610 to become a pass-through communication channel to a secondary peripheral device 610 connected to such first peripheral device 610. In one embodiment, the pass-through behavior lasts for the number of bits specified in the "Data Length" field of the SPI command. In one example embodiment, while the first peripheral device 610 is in pass-through mode, the second peripheral device 610 will directly receive the SPI input data (presented via SDI) and will drive the SPI chain outputs (as observed via SDO). In one example embodiment, the second peripheral device 610 may in turn be configured as a pass-through for communicating with a third peripheral device 610, and so on.

In one embodiment, for routing (similarly) an SPI command sent to a peripheral device 610 directly connected to a TrueNorth system may instruct such peripheral device 610 to become a pass-through communication channel to any (or all) of a plurality of secondary targets. In one example embodiment, a peripheral device 610 may act as a hub or node to branch into many possible target peripheral devices 610, therefore acting like a router.

In one embodiment, chaining peripheral devices 610 and routing within the peripheral devices 610 is handled via AER. In one embodiment, AER packets are intended to flow through a routing network, therefore, a peripheral device 610 may directly implement one or several virtual nodes internally. In one embodiment, a virtual node within the peripheral device 610 may act as a repeater, where an AER packet received through an input port is directly and transparently repeated on an output port. In one embodiment, a virtual node within the peripheral device 610 may act as a router, where an AER packet is updated—by decrementing the DY or DX fields on the packet—before it is transmitted to a secondary node on the same or other peripheral device 610.

In one embodiment, networks of peripheral devices 610 may be implemented through the use of SPI and/or AER. In one embodiment, peripheral devices 610, many of which may have multiple input and output ports, may be interconnected to form a local network of input and output devices.

In one example embodiment, computational nodes comprised of TrueNorth systems may also be interspersed within the network of peripheral devices 610. In one embodiment, peripheral devices 610 may also include long-range transceivers (e.g., WiFi access points or cellular transceivers), such that one local network of peripheral devices 610 may be connected to a remote network of peripheral devices 610, forming a native wide area network.

Figure 7:
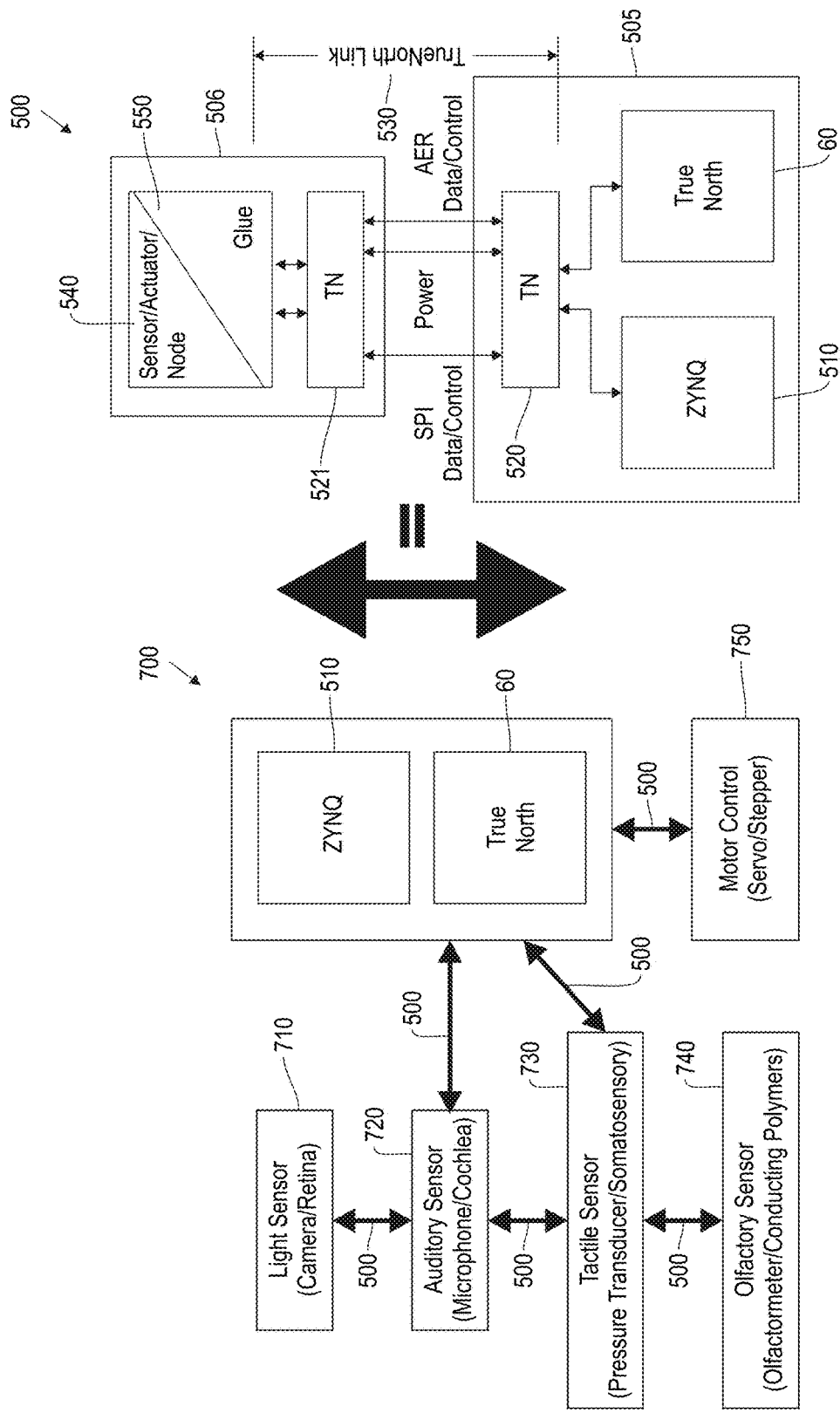
FIG. 7 illustrates examples of connecting peripheral devices to TrueNorth/Zynq processing units, in accordance with an embodiment of the invention.

FIG. 7 illustrates examples of connecting peripheral devices to TrueNorth/Zynq processing units, in accordance with an embodiment of the invention. In one embodiment, the example neuromorphic/neurosynaptic system/network 700 includes multiple peripheral devices 710, 720, 730 and 740 connected via TrueNorth systems 500. In one embodiment, peripheral device 710 may comprise a light sensor (e.g., a camera, virtual retina, etc.); peripheral device 720 may comprise an auditory sensor (e.g., a microphone, virtual cochlea, etc.); peripheral device 730 may comprise a tactile sensor (e.g., a pressure transducer, virtual somatosensory, etc.); and peripheral device 740 may comprise an olfactory sensor (e.g., an olfactormeter/conducting polymers, etc). In other embodiments, more or less, and other types of peripheral devices 610 may be connected together in the neuromorphic/neurosynaptic system/network 700.

In one embodiment, the neuromorphic/neurosynaptic system/network 700 shows that several sensors may be connected together (daisy chained) or independently connected to TrueNorth 60 and ZYNQ 510 processing units through the TrueNorth links 530 of TrueNorth systems 500. In one example embodiment, the sensors (e.g., 710, 720, 730, and 740) provide the data and the ZYNQ 510 and TrueNorth 60 provide computation and motor control to a motor control device 750 (e.g., servo/stepper, etc.).

Figure 8:
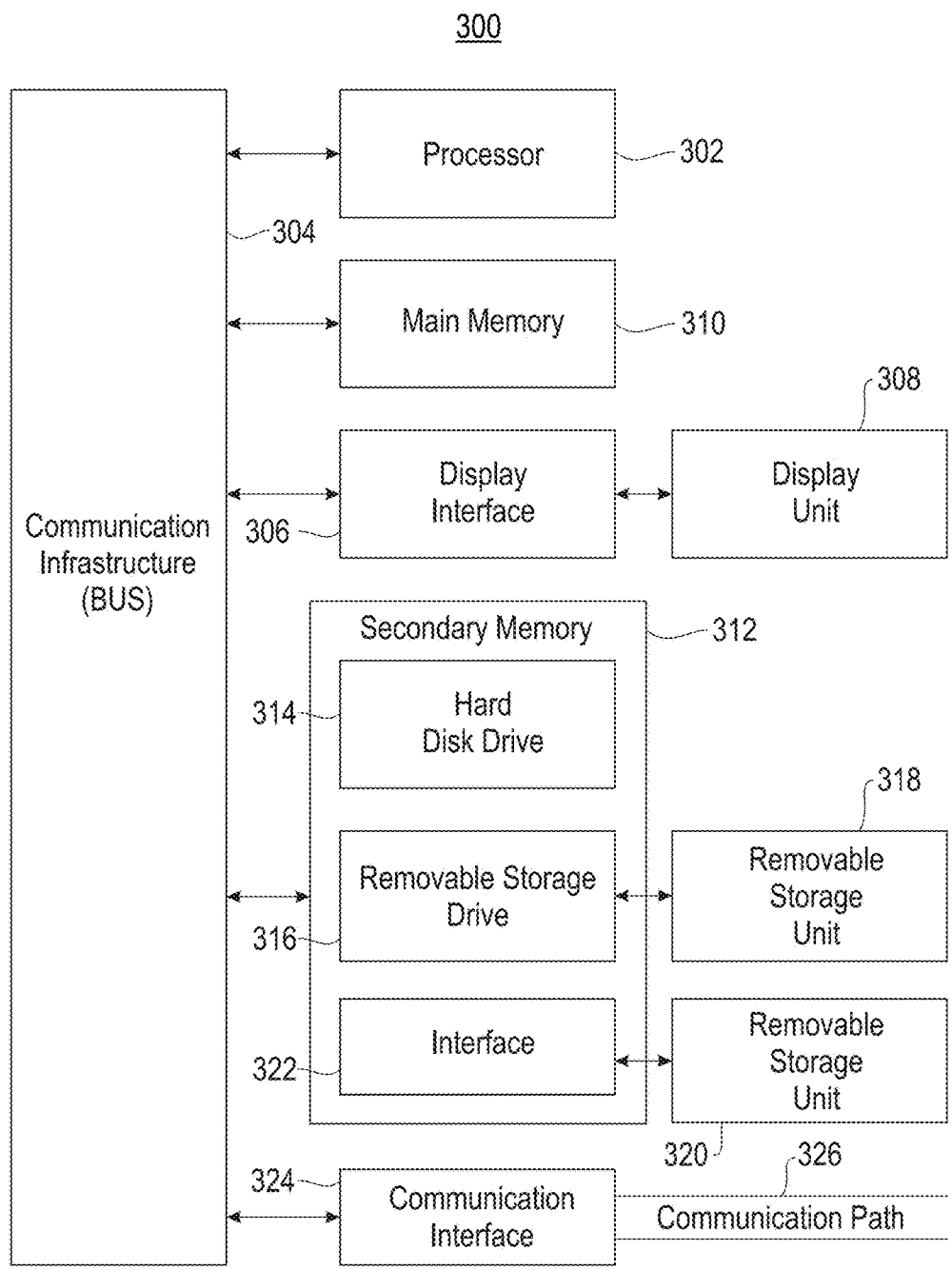
FIG. 8 is a high level block diagram showing an information processing system useful for implementing one embodiment of the present invention.

FIG. 8 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system may include a display interface 306 that forwards graphics, text, and other data from the communication infrastructure 304 (or from a frame buffer not shown) for display on a display unit 308. The computer system may also include a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM)

and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neurosynaptic system comprising:
  a neurosynaptic network circuit including a plurality of neurosynaptic core circuits;
  a first interface coupled to a peripheral device;
  a second interface coupled to the first interface, a system on chip (SoC) device, and the neurosynaptic network circuit; and
  an interconnect coupled to the neurosynaptic network circuit, wherein the interconnect comprises the first interface, the second interface, a first communication channel between the first interface and the second interface configured to exchange address event representation (AER) packets between the neurosynaptic network circuit and the peripheral device, and a second communication channel between the first interface and the second interface configured to exchange serial peripheral interface (SPI) packets between the neurosynaptic network circuit and the peripheral device and SPI packets for clocked communications to the SoC device;
  wherein the peripheral device includes firmware that supports the first communication channel and the second communication channel, and the firmware interprets an AER packet received via the first communication channel by implementing a virtualized neurosynaptic network circuit, such that a target axon, a funnel port, and a number of neurosynaptic core circuits to traverse included in the AER packet are used to target a control register on the peripheral device to change a value of a variable representing a setting of the peripheral device.

2. The system of claim 1, wherein the first communication channel comprises an asynchronous communication channel.

3. The system of claim 1, wherein the second communication channel comprises a synchronous communication channel.

4. The system of claim 1, wherein the second communication channel comprises a synchronous communication channel, and the first communication channel comprises an asynchronous communication channel.

5. The system of claim 1, wherein the neurosynaptic system further comprises a plurality of ports, each of the plurality of neurosynaptic core circuits has two associated ports, the first communication channel provides bi-directional AER communication directly between the neurosynaptic network circuit and the peripheral device, and the second communication channel provides bi-directional SPI communication between the neurosynaptic network circuit and the peripheral device.

6. The system of claim 1, wherein:
  each neurosynaptic core circuit of the plurality of neurosynaptic core circuits comprises one or more electronic neurons, one or more electronic axons, and a plurality of synapse devices for interconnecting the one or more electronic neurons with the one or more electronic axons.

7. The system of claim 1,
  wherein the value of the variable maintained by the control register is set, incremented or decreased in response to the AER packet targeting the control register, and a packet structure of the AER packet includes a first data field indicative of the target axon of the virtualized neurosynaptic network circuit, a second data field indicative of the number of neurosynaptic core circuits of the virtualized neurosynaptic network circuit to traverse in one of a northbound direction or a southbound direction, and a third data field indicative of funnel port of the virtualized neurosynaptic network circuit.

8. The system of claim 1, wherein the firmware interprets an SPI packet received via the second communication channel to determine a data register on the peripheral device to read from or write to based on one or more data fields included in a packet structure of the SPI packet, and the one or more data fields include at least one of the following: a first data field indicative of a register address defining the data register on the peripheral device to read from or write to, a second data field indicative of whether data is read from or written to the data register, a third data field indicative of a length of the data, and a fourth data field indicative of a size of the data.

9. The system of claim 1, wherein the peripheral device comprises one or more of: a sensor, an actuator, a neurosynaptic network circuit, a controller, a router, a switch, a network component, or a power source.

10. The system of claim 4, wherein synchronous communication is implemented by an SPI type interface, a host acts as a master, and asynchronous communication is implemented by a bidirectional event-based communication protocol.

11. The system of claim 1, further comprising a plurality of other interconnects coupled to the neurosynaptic network circuit, wherein the plurality of other interconnects are configured to connect to one or more other peripheral devices.

12. The system of claim 11, wherein the peripheral device and the one or more other peripheral devices communicate with each other for forming a network.

13. The system of claim 12, wherein the peripheral device and the one or more other peripheral devices comprise one or more of: sensors, actuators, neurosynaptic network circuits, controllers, routers, switches, network components, or power sources.

14. A neurosynaptic interconnect circuit comprising:
a first interface coupled to a peripheral device;
a second interface coupled to the first interface, a system on chip (SoC) device, and a neurosynaptic network circuit including a plurality of neurosynaptic core circuits;
an asynchronous communication channel between the first interface and the second interface configured to exchange address event representation (AER) packets between the neurosynaptic network circuit and the peripheral device; and
a synchronous communication channel between the first interface and the second interface configured to exchange serial peripheral interface (SPI) packets between the neurosynaptic network circuit and the peripheral device and SPI packets for clocked communications to the SoC device;
wherein the peripheral device includes firmware that supports the asynchronous communication channel and the asynchronous communication channel, and the firmware interprets an AER packet received via the asynchronous communication channel by implementing a virtualized neurosynaptic network circuit, such that a target axon, a funnel port, and a number of neurosynaptic core circuits to traverse included in the AER packet are used to target a control register on the peripheral device to change a value of a variable representing a setting of the peripheral device.

15. The circuit of claim 14, wherein the plurality of neurosynaptic core circuits use periodically spiking neurons that provide periodic spikes that are distributed across a number of axon lines in the neurosynaptic network circuit, and are also control signals for synchronizing a subset of the neurons by:
resetting the subset of the neurons; and
biasing the subset of the neurons at regular intervals.

16. A neurosynaptic system comprising:
a neurosynaptic network circuit including a plurality of neurosynaptic core circuits; and
a plurality of peripheral device interconnects each comprising:
a first interface coupled to a peripheral device;
a second interface coupled to the first interface, a system on chip (SoC) device, and the neurosynaptic network circuit;
an asynchronous communication channel between the first interface and the second interface configured to exchange address event representation (AER) packets between the neurosynaptic network circuit and the peripheral device; and
a synchronous communication channel between the first interface and the second interface configured to exchange serial peripheral interface (SPI) packets between the neurosynaptic network circuit and the peripheral device and SPI packets for clocked communications to the SoC device;
wherein the peripheral device includes firmware that supports the first communication channel and the second communication channel, and the firmware interprets an AER packet received via the first communication channel by implementing a virtualized neurosynaptic network circuit, such that a target axon, a funnel port, and a number of neurosynaptic core circuits to traverse included in the AER packet are used to target a control register on the peripheral device to change a value of a variable representing a setting of the peripheral device.

17. The system of claim 16, wherein synchronous communication is implemented by an SPI type interface, a host acts as a master, and asynchronous communication is implemented by a bidirectional event-based communication protocol.

18. The system of claim 17, wherein the plurality of peripheral device interconnects are coupled to a plurality of peripheral devices.

19. The system of claim 17, wherein the plurality of peripheral devices communicate with one another to form a network.

20. The system of claim 6, wherein the peripheral device comprises one or more of: a sensor, an actuator, a neurosynaptic network circuit, a controller, a router, a switch, a network component, or a power source.

* * * * *